United States Patent [19]

Bray

[11] 4,380,349
[45] Apr. 19, 1983

[54] COUPLERS FOR LATCHING TYPE PLUGS

[75] Inventor: John Bray, Sheffield, England

[73] Assignee: Staeng Ltd., Cornwall, England

[21] Appl. No.: 152,360

[22] Filed: May 22, 1980

[30] Foreign Application Priority Data

May 23, 1979 [GB] United Kingdom ............... 7918001

[51] Int. Cl.³ .................................. F16L 21/00
[52] U.S. Cl. .......................... 285/417; 350/96.20; 403/300
[58] Field of Search .............. 285/417, 418, 372, 317, 285/369, 314, 383, 342; 350/96.20, 96.21, 96.22; 403/300

[56] References Cited

U.S. PATENT DOCUMENTS 3,239,255  3/1966  Murcott ..................... 285/314 X
3,503,637  3/1970  Maeshiba .................. 285/317 X

FOREIGN PATENT DOCUMENTS 913833  6/1946  France ..................... 285/342

Primary Examiner—Dave W. Arola
Attorney, Agent, or Firm—Merchant, Gould, Smith, Edell, Welter & Schmidt

[57] ABSTRACT

A connector for latch type plugs has an inner member and an outer member with a resilient member between them. If a first plug is inserted in the connector, it overrides the central line as its latches engage recesses in the inner member. When the second plug is inserted into the connector, its front edge abuts against the front edge of the first plug. Further movement of the second plug causes corresponding movement in the first plug and the inner member, thereby compressing the resilient member. When the latches of the second plug have engaged with the corresponding recesses, the pressure of the resilient member, transferred via the inner and outer members, holds the front edges of the two plugs together.

3 Claims, 2 Drawing Figures

COUPLERS FOR LATCHING TYPE PLUGS

FIELD OF THE INVENTION

The present invention relates to couplers for plugs which have latches which connect with the coupler and, more particularly, to couplers for latching type plugs where the plugs are used to carry optical fibres.

DESCRIPTION OF THE PRIOR ART

It is known to provide cylindrical couplers for plugs, the plugs fitting inside the coupler and each plug having latches which engage with recesses in the inner surface of the coupler.

Referring to FIG. 1 of the accompaying drawings, which shows a known type of connector, two plugs 1 and 2 fit inside a cylindrical connector 3. Each plug 1 and 2 has latches 4 which engage recesses 5 in the inner surface of the connector 3 when the plugs 1 and 2 are inserted into the connector 3. Over-insertion of the plugs 1 and 2 into the connector 3 is prevented by providing abutment surfaces 6 on the plugs 1 and 2 which abut against the ends 7 of the connector 3 if the plugs 1 and 2 are inserted too far.

With any latching mechanism there is some necessary override of the member carrying the latches to allow the latch to operate. This override is also necessary to allow for machining tolerances. However, if one of the plugs 1 or 2 is in place, the second cannot override unless the recesses 5 are positioned so that when the plugs 1 and 2 are in place, there is a gap 8 between them. Thus, if one of the plugs 1 or 2 is in place then the override of the other plug reduces the gap 8 before the latching mechanism of that plug operates.

The presence of this gap 8, however, has a detrimental effect on the performance of the coupling between the two plugs. For example, if the plugs carry an optical fibre or optical fibres, this gap will cause a reduction in the transmission of light from one fibre to another.

The present invention seeks to eliminate the gap between the plugs without preventing the override which allows the latches to operate.

SUMMARY OF THE INVENTION

According to the present invention there is provided a connector for plugs, comprising an outer member, an inner member and a resilient member, a pair of recesses being provided in the inner member for engagement with latches provided on plugs to be inserted into said connector, the resilient member resisting longitudinal movement of the inner member relative to the outer member.

Preferably, a surface of a first plug abuts against the corresponding surface of a second plug without preventing the override of either plug.

This override of one of the plugs, the other already being in place, is absorbed by the movement of the inner member which is resisted by the resilient member. Hence the pressure of the resilient member between the inner and outer members is transferred to the plugs which are thus held together.

BRIEF DESCRIPTION OF THE DRAWINGS

The present invention will now be described in greater detail by way of example with reference to the remaining figure of the accompanying drawings, wherein.

DESCRIPTION OF THE PREFERRED EMBODIMENT

Figure 1:
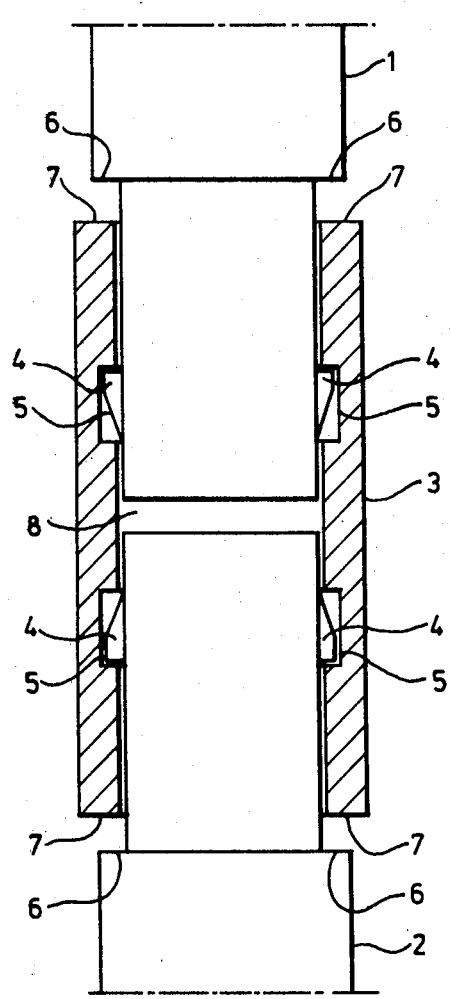
FIG. 1 shows a known type of connector for latching type plugs wherein two plugs fit inside a cylindrical connector.
Figure 2:
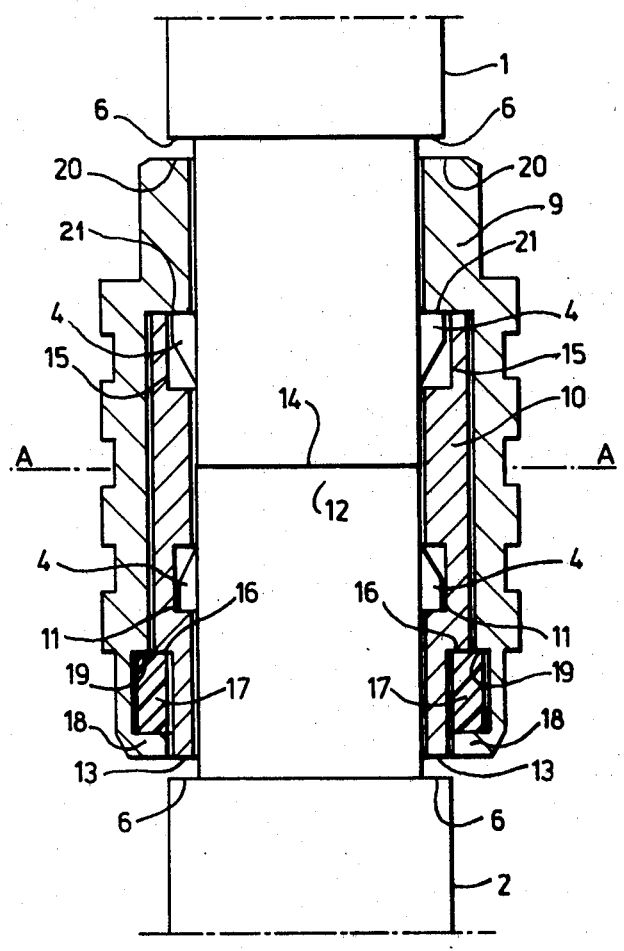
FIG. 2 shows a connector for latching type plugs according to the present invention.

Referring to FIG. 2, the plugs 1 and 2 are the same as those used in the prior art shown in FIG. 1 and have latches 4. However, the connector comprises two parts, an outer member 9 and an inner member 10 both being hollow and cylindrical.

If the plug 2 is inserted into the connector, its latches 4 engage with recesses 11 in the inner member 10. The plug 2 overrides the central line A—A during the latching process but once the latches 4 have engaged the recesses 11, the front edge 12 of the plug 2 lies on the central line A—A. Excessive override of the plug 2 is prevented by abutment of projections 6 on the plug 2 onto the ends 13 of the inner member 10.

When the other plug 1 is inserted into the connector, its front edge 14 makes contact with the front edge 12 of the plug 2. The latches 4 of this second plug 1 must override the recesses 15 formed between the inner and outer members 9 and 10. This override causes the first plug 2 and hence the inner member 10 to be pushed in the direction of movement of the second plug 1. This movement of the inner member 10 causes a projection 16 on the inner member 10 to compress a resilient member 17 which is held in place between projections 18 and 19 of the outer member 9.

Thus the motion of the inner member 10 is resisted by the resilient member 17 but this does not prevent the second plug from overriding the central line A—A. Excessive override is again prevented by abutment of projections 6 on the second plug 1 onto the ends 20 of the outer member.

Once the latches 4 of the second plug 1 have engaged the corresponding recesses 15, the plug 1 can be released. The pressure of the leading edges 12 and 14 of the two plugs 1 and 2 is transferred to the resilient member by the engagement of the latches 4 of the first plug 1 with the recess 11 in the inner member 10 and the engagement of the latches 4 of the second plug with a surface 21 of the outer member. The resilient member ensures that the surfaces 12 and 14 of the two plugs 1 and 2 are maintained in contact.

This invention can be used to connect optical fibres held in clamps having clamping sleeves according to my copending application Ser. No. 152,156 filed on the same data as the present Application. In such circumstance, the ends of the optical fibres should be slightly recessed from the front edges of the plugs to prevent contact between fibres which could cause damage. This recessing should be as small as possible.

What I claim and desire to secure by Letters Patent is:

1. A plug connector to enable the coupling of first and second plugs attached to fibre optic cables and to maintain substantial abutment between the ends of the first and second plugs, said plug connector comprising:
   a first annular member having an internal diameter fractionally larger than the diameters of the two plugs;
   a second annular member containing said first annular member and having a first section with an internal diameter equal to the internal diameter of the first annular member, a second section having an internal diameter fractionally larger than the external diameter of the first annular member, a shoulder defined by the intersection of said first and second sections, and a third section having a recess;

a resilient member located within said recess and protruding therefrom, said first member having shoulder means thereon to abut said resilient member, the arrangement being such that the first annular member has limited slideable movement within the second section of the second annular member;

a first recess provided in the first annular member at the end where it abuts against the shoulder, said first recess being provided to receive latching means of said second plug which is slideable into said second annular member;

a second recess provided in said first annular member, distant from said first recess for receiving latching means provided on said first plug which is slideable into said first annular member;

whereby said first and second plugs, first and second annular members and resilient member are so constructed and arranged that when said plugs are inserted into the coupling member said shoulder means on said first member abuts and compresses said resilient members causing said first and second member to bias and maintain said plugs in contact with one another.

2. A plug connector according to claim 1, wherein the third section of the second annular member has projection means at both ends to define the length of the recess in the longitudinal direction.

3. A plug connector according to claim 2, wherein the resilient means is an annular member.

* * * * *